United States Patent

Vaida

[11] 4,001,063
[45] Jan. 4, 1977

[54] MEASURING INSTRUMENT

[76] Inventor: Peter P. Vaida, 17 Fairview Ave., Clinton, N.J. 08809

[22] Filed: Mar. 15, 1976

[21] Appl. No.: 667,027

[52] U.S. Cl. .............................. 156/73.1; 29/407; 29/463; 33/94; 228/110; 264/23; 264/248
[51] Int. Cl.$^2$ ........................................ B32B 31/16
[58] Field of Search ............. 33/93, 94 X, 95, 381; 264/248, 23; 156/73.1; 228/110; 29/407, 463

[56] References Cited

UNITED STATES PATENTS

| 2,755,556 | 7/1956 | Lindenbein | 33/93 |
| 3,513,558 | 5/1970 | Kuehta et al. | 33/381 |

Primary Examiner—Edward G. Whitby
Attorney, Agent, or Firm—Lerner, David, Littenberg & Samuel

[57] ABSTRACT

There is provided a method for constructing and assembling an improved measuring instrument in which the frame of the instrument is made by molding a first half of the frame and molding a mating second half of the frame. The frame halves each include working or reference surfaces utilized for measuring, and openings for receiving a vial. First and second cavities are formed in the border of each of the openings for positioning the vial so that it is aligned in a predetermined angular relationship with the working surfaces. In addition, each of the frame halves include second openings, and a recess formed in the border of the second openings and extending along the frame for receiving a retaining member for attaching a ruler to the frame of the instrument. In accordance with one form of the method, a vial is inserted in the first and second cavities of one of the molded frame halves so that the longitudinal axis of the vial is in a predetermined angular relationship with the working surfaces. The mating frame halves are then aligned relative to each other and are fastened to form a unitary structure. In another embodiment, the retaining member is molded simultaneously in the same mold with the same material as one of the molded frame halves.

3 Claims, 3 Drawing Figures

MEASURING INSTRUMENT

FIELD OF THE INVENTION

The present invention relates generally to measuring instruments and, specifically, to a method of constructing and assembling an improved frame for such measuring instruments by molding mating frame halves, and assembling the parts of the instrument in such a manner as to simplify and greatly reduce the cost of manufacture.

BACKGROUND OF THE INVENTION

In the prior art, measuring instruments, such as combination squares and levels, are typically manufactured in a costly manner. For example, the frames for such measuring instruments are presently die cast in one piece so that the components, such as vials, which must be assembled with respect thereto must be done so in a costly manner. For example, U.S. Pat. No. 3,311,990 discloses a method of assembling a level including a level vial. In this patent, the level is formed from a one-piece member having a cross-section in the shape of an I-beam. Openings are formed in the web of the I-beam for receiving the level vial, and within the border of the openings notches are formed by a broaching technique to position the vial relative to the opening. The notches must be formed with relatively close tolerances and, therefore, require rather precise machining operations in order to produce the close fit required between the level frame and the vial. Accordingly, it would be desirable if such a measuring instrument could be constructed and assembled without the need for such costly precision machining operations. Moreover, in U.S. Pat. No. 3,311,990, the precision machined notches only position and locate the vial relative to the level frame, but do not hold it in place. As disclosed in this patent, additional covering plates are required to cover the web on both sides to hold the level vial in its proper position. Accordingly, it would also be highly desirable to eliminate the need for separate retaining members for holding the vial in its proper position. Such a development would reduce the number of parts required and the attendant costs, as well as the additional labor involved in assembling these additional components.

Broadly, it is an object of the present invention to provide an approved method for constructing and assembling measuring instruments which overcomes one or more of the aforesaid problems. Specifically, it is within the contemplation of the present invention to provide an improved method for constructing and assembling measuring instruments wherein the number of parts required and the labor involved are greatly reduced to simplify and reduce the cost of manufacture.

SUMMARY OF THE INVENTION

Briefly, in accordance with the principles of this invention, an improved method is provided for constructing and assembling measuring instruments, such as combination squares or level instruments which include reference surfaces and vials. In the improved method, a first half of the frame is molded and a mating second half of the frame is also molded. The present invention envisions that the frame halves do not have to be identical, but only that they mate when aligned to face each other. In one embodiment, each of the molded frame halves includes working or reference surfaces for measuring, openings for receiving one or more vials, and cavities formed in the border of each of the openings for positioning and retaining a vial in a predetermined angular relationship with the reference surfaces. As a result, after assembly of the tool, it is not required to adjust the position of the vial with respect to the reference surfaces, which surfaces may be finished by any suitable process, such as polishing. Finally, the mating frame halves are aligned relative to each other, and fastened together to form a unitary structure in which the longitudinal axis of the vial is in alignment with, and in a predetermined angular relationship with, the working surfaces of the molded frame halves.

Advantageously, as a result of the improved method of the present invention, the cavities for receiving and aligning the vial are formed by the molding of the frame halves, and thereby eliminates costly precision machining operations and the attendant close tolerances which were required in earlier instruments to properly align the vial with respect to the working surfaces of the instrument. In addition, the present method also eliminates the need for precision machining of the working or reference surfaces which in the present invention are accurately formed by the molding operation. Moreover, because the molded frame halves are mated and fastened together after the vial is positioned within the cavities of one of the frame halves, this eliminates the requirement of cover plates or other retaining members for holding the vial in place relative to the instrument, as in prior art devices.

Moreover, in accordance with the present invention, in addition to the frame halves being molded, other components of the finally assembled instrument are also simultaneously molded in the same mold and with the same material as the molded frame halves. For example, in accordance with the present invention, the retaining member of a combination square instrument is molded simultaneously and in the same mold and with the same material as the molded frame halves from which the combination square is assembled. As a result, the components of the finally assembled instrument, that is, the molded frame halves and the molded retaining member, all have the same characteristics, tolerances and coefficients of expansion. In this manner, the fitting of the various components relative to each other during assembly is much more accurate than if, for example, the retaining member was molded in a different mold, or with different material, than the molded frame halves.

BRIEF DESCRIPTION OF THE DRAWINGS

Further objects, features, and advantages of the present invention will become apparent upon the consideration of the following detailed description of presently preferred embodiments when take in conjunction with the accompanying drawings, wherein.

DETAILED DISCUSSION OF PREFERRED EMBODIMENTS OF THE INVENTION

Figure 1:
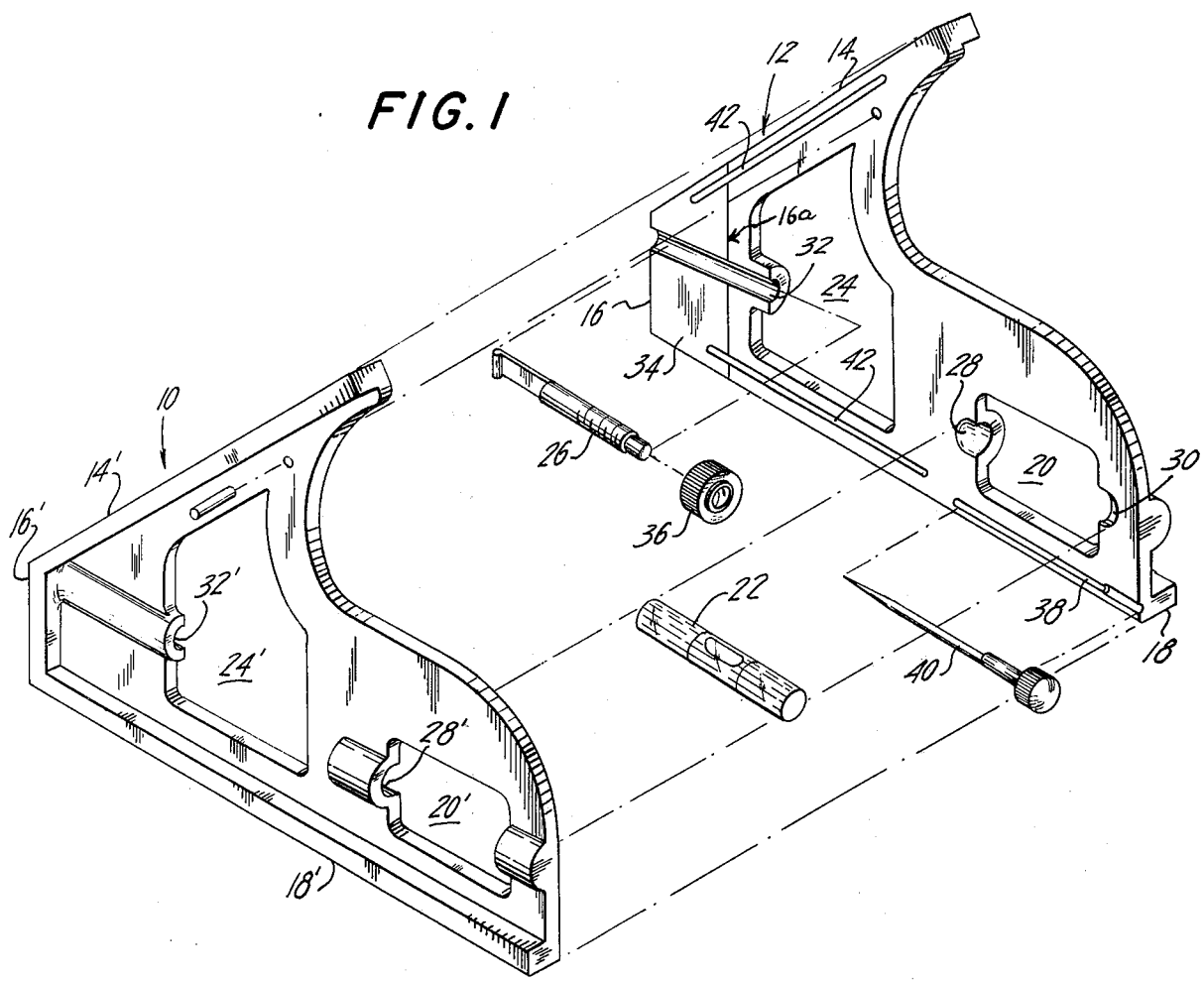
FIG. 1 is an exploded perspective view of a combination square instrument constructed and assembled in accordance with the method of the present invention.
Figure 2:
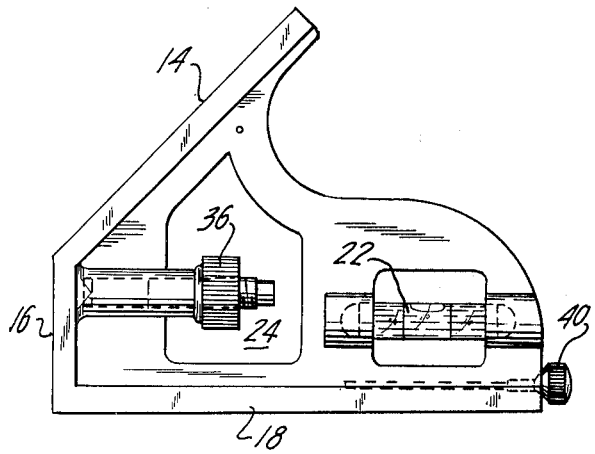
FIG. 2 is a front elevational view of the assembled combination square instrument including a vial and a retaining member.
Figure 3:
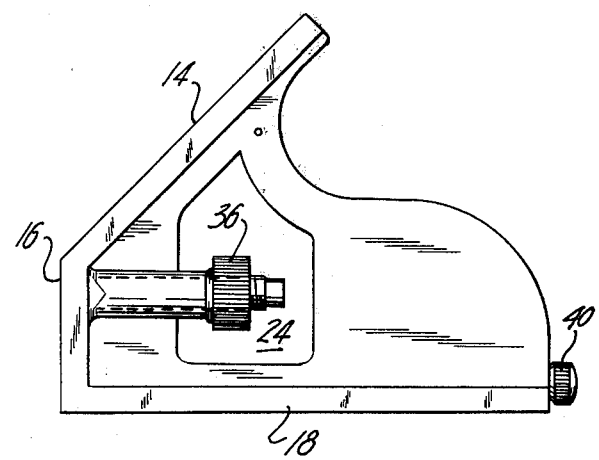
FIG. 3 is a front elevational view of another embodiment of a combination square instrument employing the method of the present invention.

Referring now to FIG. 1, there is shown a measuring instrument to be constructed and assembled in accordance with the improved method of the present invention, generally designated by the reference numeral 10. Although the drawing illustrates the method of the present invention being utilized in a combination square instrument, it is to be understood that this is for purposes of illustration only, and that the method of the present invention may be utilized to construct and assemble other types of measuring instruments, including levels and squares. Accordingly, for ease of consideration, the method of the present invention will be explained with reference to a combination square.

As shown in FIG. 1, frame halves 12, 12' are molded from any suitable moldable material, including plastics or metals. For example, CELCON may be employed, the brand name for a commercially available plastic. As each of the frame halves 12, 12' are substantially similar and mating halves, only molded frame half 12 will be described in detail, and the corresponding features of molded frame half 12' will be designated with primed reference numerals.

Molded frame half 12 is molded to include working or reference surfaces 14, 16 and 18, which are conventional. Parallel to working surface 16, a ledge 16a is molded so that wall portion 34 is slightly offset or recessed with respect to the remainder of the frame half. In this manner, a straight edge or ruler may be mounted along surface 16a when the frame halves are mated. Of course, surface 16a must be precisely perpendicular to surface 18 and at 45° to surface 12.

An opening 20 is formed in frame half 12 for receiving a vial 22, in a manner to be explained, and an opening 24 is also formed in frame half 12 to receive one end of a retaining member 26, as will be explained. Along the border of opening 20, there are also formed in molded frame half 12 recesses 28, 30 which cooperate with the recesses 28', 30' of the other frame half 12' when mated therewith to define a cavity for receiving vial member 22. In the embodiment shown, recesses 28, 30 are formed to receive vial member 22 in a longitudinally extending manner, but it should be understood that recesses 28, 30 may be formed on the other sides of opening 20 so that vial member 22 may be disposed therein in a vertically extending manner if desired. Recesses 28, 30 are aligned in a predetermined angular relationship with reference surfaces 14, 16a and 18 so that in the final assembly, the vial member 22 is properly aligned with these surfaces. Recesses 28, 30 not only allow vial member 22 to be properly positioned relative to the reference surfaces of the frame, but also in the final assembly, recesses 28, 30 of each frame half cooperate to define a cavity between the frame halves which holds vial member 22 relative to the final frame without the need of additional retaining or holding members, as in prior art devices.

In the border of opening 24, there is also molded a recess 32 which extends along the wall portion 34 of molded frame half 12. Recess 32 cooperates with the recess of the other frame half when mated therewith to define a cavity for receiving a retaining member 26. Retaining member 26 is preferably molded from the same material, plastic or metal, as molded frame halves 12, 12', and is also molded simultaneously and in the same mold as the frame halves. As a result, the components of the final assembly have the same characteristics, tolerances and coefficients of expansion. Accordingly, in the final assembly, the components are tight fitting and are not affected by the usual variances caused by different molding operations, temperatures, etc.

A straight edge or ruler (not shown) is held in place along reference surface 16a by retaining member 26, and the molded frame halves when mated. A threaded nut 36 is provided for attaching and/or removing the ruler from the instrument.

Molded frame half 12 may also be provided with a recess 38 which cooperates with the recess of the other frame half when mated therewith to define a cavity for receiving and retaining a marking or scratching pin 40, as is commonly employed with such instruments.

After the molding operation, the elements of the measuring instrument are assembled as follows. The vial member 22 is inserted in recesses 28, 30 of one of the frame halves so that its longitudinal axis is in a predetermined angular relationship with the reference surfaces. Then the frame halves 12, 12' with the vial member 22 therebetween, are aligned relative to each other. Next, each of the molded frame halves, 12, 12' are fastened together to form a unitary structure 10 in which the longitudinal axis of the vial member 22 is in alignment with and in a predetermined angular relationship with the reference surfaces of the final frame. Then, one edge of the straight edge or ruler is positioned adjacent to reference surface 16a between wall portions 34, 34'. Retaining member 26, which has been molded with one of the frame halves, is inserted into the cavity formed by recesses 32, 32' to secure the ruler relative to the final frame, and nut 36 is employed to tighten retaining member 26 relative thereto. Finally, the marking pin 40 is inserted into the cavity formed by recesses 38, 38' to provide the completely assembled measuring instrument.

Any suitable fastening method may be employed to fasten frame halves 12, 12' together to form the unitary structure 10. However, in the preferred embodiment, ridges 42 are formed along the edges of frame members 12, 12', which ridges are formed of suitable plastic material. Accordingly, in fastening the frame halves 12, 12', they may be ultrasonically welded together by welding the frame halves along ridges 42.

In view of the foregoing, it should be clear that there has been provided in accordance with the present invention, an improved method for constructing and assembling measuring instruments which greatly simplifies and reduces the cost of manufacture. This results in the elimination of precision machining operations and reducing the number of parts required. In addition, by the present molding technique, the components of the final assembly are assembled without variations caused by different molding operations or materials, and thereby provide a close fitting assembly with relatively close tolerances.

A latitude of modification, change and substitution is intended in the foregoing disclosure and, in some instances, some features of the invention will be employed without a corresponding use of other features. Accordingly, it is appropriate that the appended claims be construed broadly and in a manner consistent with the spirit and scope of the invention herein.

What is claimed is:

1. A method of making a frame for a measuring instrument, said instrument including reference surfaces and a vial disposed in a desired orientation with respect to said reference surfaces, comprising the steps of:

molding a first part of said frame, molding a mating second part of said frame, said molded frame parts each including reference surfaces, openings for receipt of a vial, and first and second recesses formed in the border of each of said openings for positioning said vial, said first and second recesses being aligned in a predetermined angular relationship with respect to said reference surfaces and cooperating to form oppositely disposed cavities when said molded frame parts are in mating relationship;

placing a vial in recesses of one of said frame parts, the longitudinal axis of said vial being in said predetermined angular relationship with said reference surfaces;

aligning said frame parts in mating relationship with said vial in said cavities; and fastening said mated frame parts together to form a unitary structure in which the longitudinal axis of said vial is disposed in said predetermined angular position.

2. A method of making a frame for a combination square instrument, comprising the steps of:

molding a first half of said frame, and molding simultaneously in the same mold and with the same material a retaining member;

molding a mating second half of said frame;

said molded frame halves each including reference surfaces, openings for receiving said retaining member, and a recess which cooperates with the recess of the other frame half when mated therewith to define a cavity for receipt of said retaining member;

aligning said mating frame halves relative to each other;

fastening said mated frame halves together to form a unitary structure; and inserting said retaining member in said openings and in the cavity formed by said recesses.

3. A method in accordance with claim 2 wherein said fastening step includes bonding said frame halves by ultrasonic welding.

* * * * *